UNITED STATES PATENT OFFICE.

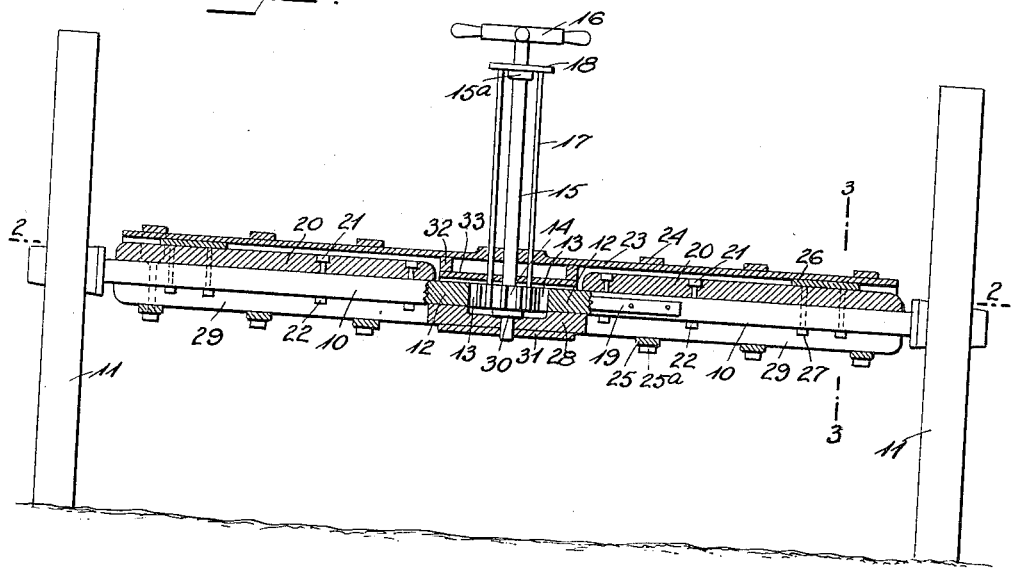
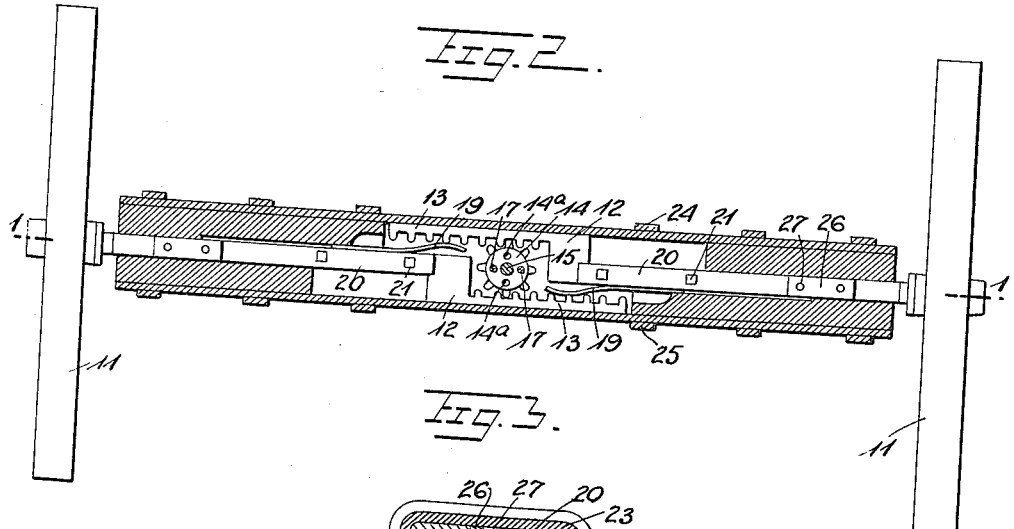
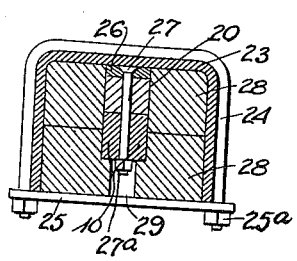

WILLIAM ELLIS WISE, OF WILLIAMSPORT, PENNSYLVANIA.

AXLE.

1,143,475.

Specification of Letters Patent. Patented June 15, 1915.

Application filed October 29, 1914. Serial No. 869,225.

*To all whom it may concern:*

Be it known that I, WILLIAM E. WISE, a citizen of the United States, and a resident of Williamsport, county of Lycoming, State of Pennsylvania, have invented a new and Improved Axle, of which the following is a full, clear, and exact description.

My invention relates to a vehicle axle of the type formed in sections, and adapted to be extended or contracted.

The invention is more particularly designed for use on the combination sleigh and wheeled vehicle forming the subject of an application for patent filed by me December 29, 1913, Serial No. 809,234, in which sled runners are adapted to be lowered from a raised position beneath the vehicle wheels when it is desired to convert the vehicle into a sleigh. The desirability of providing an extensible vehicle axle is due to the fact that the gage of vehicle wheels is, as a rule, considerably wider than that of sleigh runners, and also vehicle wheels in different parts of the country are to a certain extent, of varying gage.

The prime object of my invention is to provide a vehicle axle of the type indicated, improved in various particulars, to the end that the adjustment may be effected with convenience and the axle maintained firmly in adjusted position.

The invention will be particularly explained in the specific description following.

Reference is had to the accompanying drawings forming part of this specification, in which similar characters of reference indicate corresponding parts in all the views, and in which:

Figure 1 is a sectional rear elevation of an axle embodying my invention; Fig. 2 is a sectional plan view on the line 2—2 Fig. 1; and Fig. 3 is a transverse section on the line 3—3, Fig. 1.

In constructing a practical embodiment of my invention in accordance with the illustrated example, axle sections 10 are provided each being adapted to receive a running wheel 11. At the inner end of each section an offset element 12 is formed upon or secured to the section, and on the offsets are formed racks 13. The racks overlap and are spaced to receive between them a pinion 14 meshing with both racks, so that by the turning of the pinion it may be caused to move the racks inwardly or outwardly to carry the wheels 11 outward or inward as desired. The pinion 14 is actuated by a shaft 15 standing upwardly from the pinion and provided at the upper end with a hand wheel 16 or equivalent formation to facilitate the turning of the shaft. Associated with the shaft 15 and the pinion are pins 17 which are united at the upper ends by a head 18 slidable on the shaft 15 above a collar $15^a$ on the latter. The head 18 being adjacent to the hand wheel 16 of the shaft may be readily grasped by the driver of the vehicle to raise or lower the pins 17 and to free the pinion 14 and permit it to be turned by the shaft 15 and the hand wheel or to lower the pins into a pair of holes $14^a$ in the pinion 14, there being a series of such holes $14^a$ to receive the pins in different positions of the pinion.

I provide resilient means frictionally engaging the racks 13 to act as a brake and prevent too free a movement of the racks in the adjustment of the axle sections. Preferably the resilient means consists of plate springs 19, one spring being secured to each axle section 10, and having a free end bearing against the teeth of the opposite rack 13, as clearly shown in Fig. 2.

The axle sections 10 are of metal, and in order to strengthen the same, and also to afford guided movement therefor, as well as to provide bearings and supports for the pinion 14, shaft 15, and the locking pins 17, the axle may be built up as follows: On top of each axle section 10 a strip 20 of wood is secured as by vertical bolts 21 and nuts 22, or other suitable securing means. Around the exterior of the axle at the top and sides is a metallic casing 23 secured by clips or straps here shown as comprising straps 24 extending over the top and sides of the casing and a clip plate or bar washer 25 joining the lower ends of the straps and held in position by nuts $25^a$. Within the casing 23 at the sides is a filler body of wood 28 which may be formed in sections to facilitate its application to the axle.

The axle sections 10 and their wood strips 20 have sliding movement in the wood body 28 and beneath the casing 23. In order to insure the smooth movement of the axle sections in the casing, wear plates 26 are secured to the top of each strip 20 between the same and the casing 23. The plates 26 may be secured in any suitable manner, there being shown as one example of means for the purpose, bolts 27, the nuts 27ᵃ of which, at the underside of the axle sections 10, are accommodated in longitudinal slots 29 in the wood filling 28, at the underside of the axle. The slots 29 extend inwardly to a point short of the center, and at the center of the axle the wood filling 28 and the casing 23 are formed to accommodate the pinion 14 and to form bearings for the shaft 15 and guides for the pins 17. At the underside of the pinion the shaft 15 has a collar 30 resting on the filling 28 and a strengthening plate 31 is secured at the underside of said filling. The center of filling 28 has a bearing for the lower end of the shaft. It is to be understood that the plates may be secured in any suitable manner. Above the pinion 14 the casing 23 may have secured thereto a plate 33 by blocks 32, the said plate 33 overlying the pinion 14, and the shaft extends through the casing 23 and through the plate 33, and bearings, and registering orifices are formed in the casing and the plate 33 to receive and guide the pins 17 in their vertical movement to release or engage the pinions 14.

Having thus described by invention, what I claim as new and desire to secure by Letters Patent, is:

1. An axle comprising two sections each adapted to receive a wheel at the outer end, racks on the sections at the inner ends, a pinion meshing with the racks to slide the same and extend or contract the axle, a shaft on which the pinion is mounted, means on the shaft to turn the same, and means for locking the pinion, the said locking means consisting of pins ranging alongside the shaft, and a head carrying said pins slidably mounted on the shaft adjacent the upper end thereof, the said pinion having a series of holes to receive said pins.

2. An axle comprising two sections adapted to receive wheels, racks rigid with the sections at the inner ends, a pinion meshing with the racks to adjust the sections, means to turn the pinion, and spring means in frictional engagement with the racks to yieldingly resist movement thereof.

3. An axle comprising two sections adapted to receive wheels, racks rigid with the sections at the inner ends, a pinion meshing with the racks, means to turn the pinion, a filler body extending along the sides of both axle sections, said body being longitudinally slotted at its ends, a metallic casing over the sides and top of said body, means uniting the sides of the casing at the underside of the axle, strips secured to the upper sides of the axle sections to move therewith, wear plates over the said strips and secured thereto between the same and the casing, and vertical bolts securing the said strips and wear plates, the bolts having nuts accommodated in the slots of the body.

4. An axle comprising two sections adapted to receive wheels, racks rigid with the sections at the inner ends, a pinion meshing with the racks, a shaft on which the pinion is mounted, a filler body embracing the racks and having slots at the underside at each end, a casing surrounding the body, the casing having a plate at the center above the pinion and the said casing, and a plate below the filler body and forming a bearing for the lower end of the shaft.

In testimony whereof I have signed my name to this specification in the presence of two subscribing witnesses.

WILLIAM ELLIS WISE.

Witnesses:
  H. W. CONNELL,
  A. MORRISON.